3,423,391
CONTINUOUS DIAZOTIZATION PROCESS
Hubert Kindler, Ludwigshafen (Rhine), and Dominik Schuler, Mannheim, Germany, assignors to Badische Anilin- & Soda-Fabrik Aktiengesellschaft, Ludwigshafen (Rhine), Rhineland-Pfalz, Germany
Continuation of application Ser. No. 414,332, Nov. 27, 1964. This application Feb. 20, 1967, Ser. No. 617,422
Claims priority, application Germany, Nov. 28, 1963, B 74,433
U.S. Cl. 260—141        3 Claims
Int. Cl. C07c *113/00;* B01j

ABSTRACT OF THE DISCLOSURE

A process for a continuous diazotization of amines in which substantially all of the heat of reaction is absorbed by the reaction mixture. The amine and the diazotizing agent are passed to a mixing and reaction zone where the temperature of the reaction rises by from 20 to 50° C. The reaction product is then rapidly processed to convert the diazo compound to a stable form.

---

Figure 1:
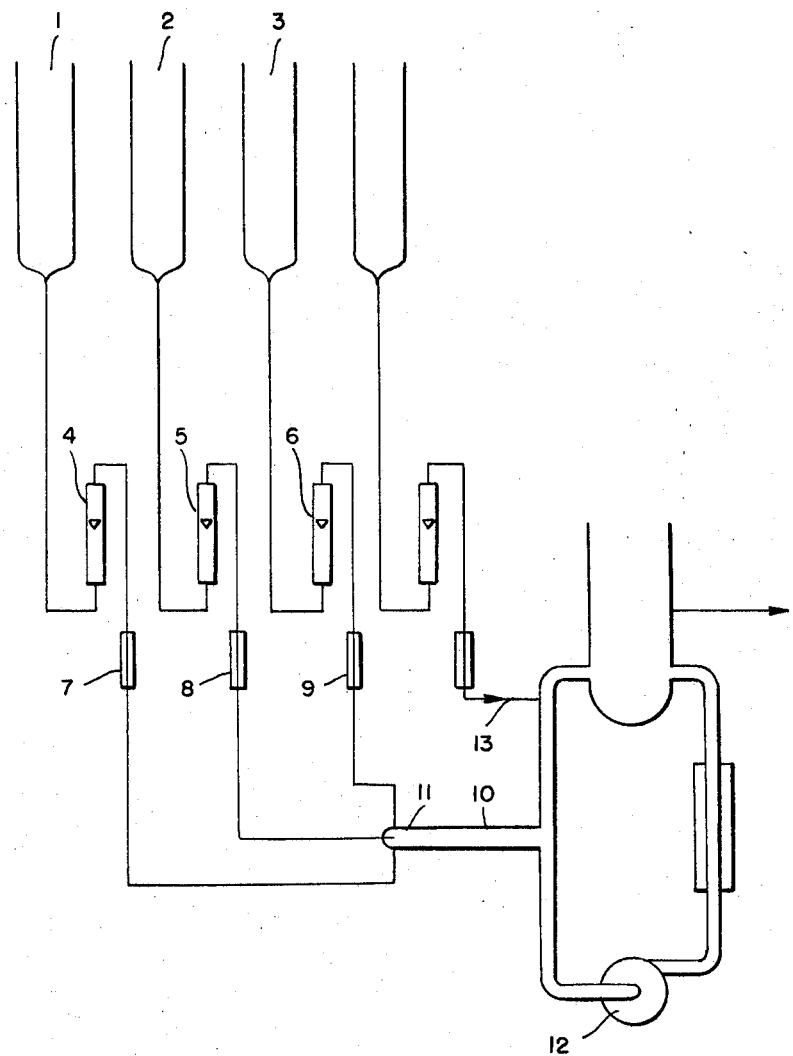

This application is a continuation of copending application Serial No. 414,332, filed November 27, 1964, and now abandoned.

This invention relates to a process for the continuous diazotization of amines with diazotizing agents and for the further reaction of the resultant diazo compounds or for their recovery as such. The invention relates particularly to a diazotization process which can be carried out at relatively high temperatures and which therefore proceeds rapidly.

Diazotization of amines with nitrous acid was discovered by Peter Griess in 1858. Although it has been widely used on an industrial scale, it is even now carried out exclusively batchwise and generally at temperatures of about 0° C., and it is necessary to remove by cooling the considerable heat of reaction formed. Several parts by weight of ice are required for each part of amine and this makes the process more expensive.

Continuous diazotization is even more unfavorable and has therefore hitherto not been carried out on an industrial scale; in this case again the main problem is removal of the heat of reaction. It has already been recommended that the reaction be carried out in one or more agitated vessels or circulation systems to which reaction vessels are attached, it being necessary to remove the heat of reaction by a refrigerating machine through an exchanger. The temperature is kept at 0° C. or slightly higher.

Other known processes use a film evaporator capable of being cooled and heated (Luwa or Samesreuther) and in some cases a reactor for carrying out an isothermal diazotization. Shortening of the reaction periods and in some cases a change from ice cooling to water cooling is thus achieved, but only by considerable expenditure for equipment.

We have now found that continuous diazotization can be carried out in a considerably improved manner with very low expenditure for equipment and the diazo compounds formed may be further reacted or recovered, by continually mixing and reacting the reactants, the heat of reaction being substantially absorbed by the reaction mixture with a rise in temperature and the diazo compounds formed being recovered or further reacted before an appreciable proportion thereof has decomposed.

As compared with conventional batchwise or continuous methods, all of which are based on isothermal processes, the new process has considerable advantages. These include, firstly, dispensing wholly or partly with the removal of heat of reaction from the reaction mixture, which is necessary in all prior methods, so that to a corresponding extent an adiabatic course of the reaction is made possible. Another considerable advantage is simplicity of the equipment and a quite considerable shortening of reaction periods in the new process which leads to a very considerable increase in the space-time yields. Furthermore the new process has the advantage of being widely applicable and adaptable to the prevailing conditions.

As already stated, it is an essential feature of the new process, and at the same time a great advantage, that the heat of reaction is wholly or at least partly absorbed by the reaction mixture. Thus in all cases part of the heat of reaction is removed. A purely adiabatic course is naturally only a theoretically interesting limiting case. In fact, even with the most careful insulation, certain amounts of heat are removed. Measures which facilitate the removal of heat may be entirely dispensed with in the new process. The equipment is thus considerably simplified and less liable to develop faults because cooling is no longer necessary. Naturally no precautions are taken in general to prevent escape of heat from the reaction mixture. Rather it is simplest to permit the relatively slight escape of heat which results when neither cooling nor insulation is used and the heat of reaction therefore remains practically completely in the reaction mixture, i.e., the reaction is substantially adiabatic. Naturally it is also possible to provide means for cooling so that only part of the reaction heat is absorbed by the reaction mixture. Even this method has considerable advantages over isothermal reaction, for example as regards space-time yields and expenditure for coolant, although there is in general no particular advantage over the abovementioned embodiment in which neither cooling nor insulation is used.

Having regard to the known decomposability of diazo compounds, especially of diazonium salts, it is surprising that their preparation may be carried out according to the new process while completely or substantially absorbing the heat formed by the reaction mixture, without secondary reactions occurring to any appreciable extent, and that further reaction of the diazo compounds formed generally proceeds at a very high rate. Even at room temperature or elevated temperature it is therefore possible substantially to avoid decomposition of the diazo compounds provided they are rapidly further processed. In certain cases, intentional preheating of the reaction components, so that the temperature of the diazo compounds may rise to 100° C. or more, may be attended by advantages. The short reaction periods necessary according to the new process, which may amount to fractions of a second, make possible excellent space-time yields not hitherto attainable and the throughput of industrial quantities through small low-cost units. As cooling may be dispensed with, either completely or partly, particularly below ambient temperature, considerable savings in equipment and materials may be achieved.

Another advantage of the new process is its considerable flexibility. It permits the use of all diazotizable amines, may be carried out in a great variety of apparatus and, depending on the way in which it is carried out, gives the possibility of obtaining the resultant diazo compounds substantially under the conditions, for example as regards concentration, temperature and the like, desired for any further processing. Instability of the diazo compounds formed naturally makes rapid further processing necessary, i.e. recovery of the same in substance or their further reaction, thus preventing decomposition (for example of proportions of the order of 30% or more) which would endanger the success of the process. In other respects, further processing may be carried out in any way and for the production of all products obtainable from diazo compounds both while retaining or eliminating the nitrogen atom, for example, by way of coupling reactions, various forms of Sandmeyer reaction, reaction to form hydrazines or phenols and the like or the separation or precipitation of the diazo compounds as such.

The gist of this invention does not reside in the selection of any particular amines or diazotizing agents. The amines for the new process may, as already stated, rather be any diazotizable amines, including primary monoamines and polyamines of aromatic character, derived for example from benzene, from condensed ring systems with 2 to 4 benzene nuclei to which heterocycles, such as the pyridine ring, may be anellated, from heterocyclic compounds of aromatic character, such as pyridine, thiazole or thiophene, and from derivatives of all these ring systems which contain side chains and/or substituents which are inert under the reaction conditions, such as carboxylic, sulfonic, hydroxyl, amino and nitro groups and also halogen atoms and/or other electrophilic or nucleophilic substituents.

All agents capable of forming nitrous acid in the reaction mixture may be used as diazotizing agents, for example nitrites in association with acids, particularly mineral acids or mixtures of various acid substances, such as acid salts, and also nitrous acid esters or nitrosyl compounds, such as nitrosyl chloride. Inert solvents or diluents, and also catalysts or other auxiliaries and additives may be used at will. The relative proportions of the amines and diazotization agents used may be controlled in the conventional way by testing with potassium iodide—starch paper or by means of a potentiometric measuring instrument having for example platinum-silver chloride or platinum-calomel chloride electrodes.

There are many possibilities for the design of reactors which may serve for carrying out the new process. For example a flow tube may be used, which may be capable of being heated or cooled and in which the reactants react after having been mixed. Diazotization may however occur in a drop of liquid during its fall or in a liquid film or stream moving in any direction, with corresponding rise in temperature of the reaction mixture. Circulation reactors in which the initial materials and the diazo compounds formed flow in a common cycle may however also be used. Mixing of the reactants may take place immediately prior to entry into the reactor or in the reactor itself, whether by means of turbulent flow, through nozzles or in mixing chambers while supplying hydrodynamic, mechanical or pneumatic energy. When sparingly soluble or slow reacting components are used, the diazotization may be completed in a dwell zone, if desired with cooling or heating. Further processing of the diazo compounds thus formed into azo dyes, phenols, hydrazines or other compounds capable of being prepared therefrom may also be carried out, preferably continuously, in reactors of conventional types, for example in flow tubes, if desired capable of being cooled or heated, agitated vessels or a cascade of such vessels or a circulation reactor.

A favorable embodiment of a reactor for carrying out a substantially adiabatic reaction according to this invention will now be described with reference to FIGURE 1 of the accompanying drawings in which the reactor is shown diagrammatically. From reservoirs 1, 2 and, if desired, 3, flow the components: diazotization agent (1), amine or amine salt to be diazotized (2) and, if required, acid or a mixture of acid substances (3), through measuring and control instruments 4, 5 and possibly 6, if required through heat exchangers 7, 8 and possibly 9, into a flow tube 10. The materials are mixed here, for example by means of a nozzle 11, and reacted during a short residence period and without cooling, i.e. with a rise in temperature. The diazo compounds, often obtained in quantitative or almost quantitative yield, may then be further processed in an immediately adjacent circulation system 12 with the addition at 13 of any further components required for the further processing.

Figure 2:
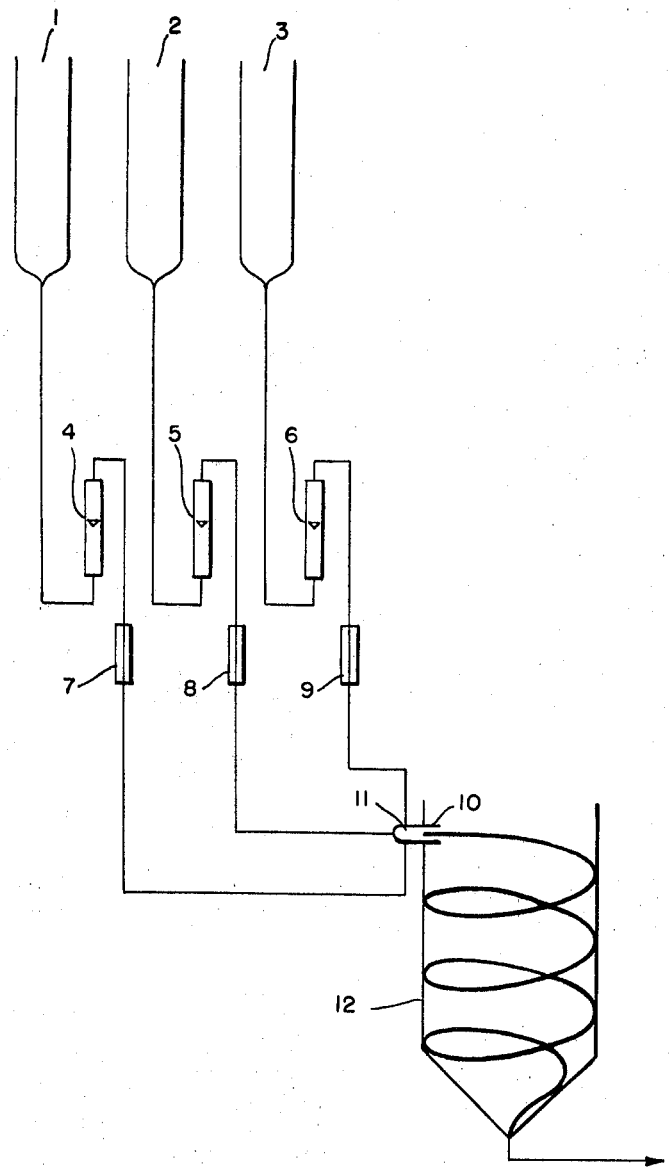

Another possible embodiment is shown diagrammatically in FIGURE 2 of the accompanying drawings. This comprises reservoirs 1, 2 and possibly 3 and the appropriate measuring and control instruments 4, 5 and 6 and heat exchangers 7, 8 and 9. Combination of the reacting components takes place here in a very short tube 10 by means of a nozzle 11 which sprays the reaction mixture tangentially onto the inner wall of a cyclone type container 12 in which it flows down in a spiral path and further reacts during a short residence period.

Naturally, the new process may also be carried out while partly removing the heat of reaction by using reactors having an inner chamber capable of being cooled; the reaction is then no longer substantially "adiabatic", but is still "adiabatic" to a considerable extent, and the reaction heat is partly removed from the reaction mixture, for example to the extent of up to 50%, preferably up to 25%. For example when using flow tubes having cooling jackets, a relatively small proportion of the heat of reaction formed may be removed through the walls of the tube.

The reaction periods may be adapted to the prevailing requirements by means of the equipment suitable for the new process. In particular it is possible without difficulty to achieve extremely short reaction periods of small fractions of a second. On the other hand, longer reaction periods are also possible, so that residence periods of about 0.01 second up to about thirty minutes, preferably of 0.1 to thirty seconds may be used. With the shorter reaction periods a precooling of the initial components may be dispensed with without disadvantage, even if the temperature of the reaction mixture rises by 20° to 50° C. or more and the diazo compounds formed are obtained at 40° to 80° C.; in the case of high melting point or sparingly soluble components it may even be advantageous, as already stated, to preheat the initial materials and thus to allow the temperature of the diazo compounds obtained to rise to 100° C. or even higher. The unforeseen advantage of the new process is evident, it being possible to produce the products on a commercial scale or to carry out the further processing of these products in relatively simple and space-saving equipment.

The relative proportions of the reactants and the concentrations used may be varied within wide limits. It is often advantageous to use the diazotization agent in approximately the stoichiometric ratio and any acid or acid mixture used in the ratio of 1 to 3 equivalents with reference to 1 equivalent of amine, and to use concentrations of from 0.003 to 3 moles per liter.

The diazo compounds obtained are separated or further reacted so rapidly that no appreciable amounts of decomposition products can form. Obviously, it is necessary that the diazo compounds and the reactants for the subsequent reaction should be rapidly and completely mixed with each other. Further processing may be carried out for example in a circulation reactor, an agitated vessel or a flow tube, the heat of reaction being partly removed if desired. The diazonium compounds may be separated in conventiontal manner, e.g., by precipitation as tetrafluorborates or in the form of other suitable compounds.

The reaction temperature may vary within wide limits also in this further processing and may for example be −5° to +110° C. or even higher. It is preferably from 10° to 100° C.

Catalysts, such as are customary for example in the Sandmeyer reaction, and other auxiliaries may also be added.

The reaction periods may extend from fractions of a second to many hours, but they are almost always less than one hour and frequently even less than one minute. The reaction mixture may then be allowed to react further or may be stored until it is further processed.

The invention is further illustrated by the following examples. The yields given are with reference to the amine used. Parts are weight.

EXAMPLE 1

3,940 parts of a solution of 87 parts of sulfanilic acid, 21 parts of sodium hydroxide and 35 parts of sodium nitrite in 857 parts of water (reservoir 1) and 2,070 parts of a solution of 90 parts of hydrogen chloride in 910 parts of water (reservoir 2), both at 25° C. are allowed to flow per hour in a plant as shown in FIGURE 1 of the accompanying drawings, through the appropriate measuring and control means and heat exchangers into the reactor in a continuous stream and are united therein with good mixing, for example by means of a nozzle. The mixture flows through the reactor within 1.3 seconds. It has then reached a temperature of about 45° C. It is reacted immediately thereafter.

To prepare the azo dye from sulfanilic acid and β-naphthol, the hot diazo solution is reacted hourly in a circulation reactor with a solution of 73 parts of β-naphthol, 21 parts of sodium hydroxide and 106 parts of sodium carbonate in 800 parts of water. The dye may be recovered from the effluent dye solution in a yield of 95% of the theory by salting out, filtration and drying.

To prepare the azo dye from sulfanilic acid and 1-phenyl-3-methylpyrazolone-(5), the hot diazo solution is reacted hourly with 4,000 parts of a solution of 89 parts of 1-phenyl-3-methyl-pyrazolone-(5), 21 parts of sodium hydroxide and 106 parts of sodium carbonate in 784 parts of water in the circulation reactor. The effluent dye solution gives a yield of 96% of the theory when worked up as described above.

EXAMPLE 2

The procedure of Example 1 may be used for the production of azo dyes of metanilic acid, but using the same amount of metanilic acid instead of sulfanilic acid. Production of the azo dye of metanilic acid and β-naphthol and of the azo dye of metanilic acid and 1-phenyl-3-methyl-pyrazolone-(5) carried out as described in Example 1 gives in each case a yield of 93% of the theory.

EXAMPLE 3

In the apparatus according to FIGURE 1, 4,260 parts of a solution of 64 parts of p-chloroaniline and 45 parts of hydrogen chloride in 889 parts of water (reservoir 1) and 4,260 parts of a solution of 36 parts of sodium nitrite in 964 parts of water (reservoir 2), both at 25° C., are mixed per hour at the entrance to the flow tube and reacted to the diazo solution in a reaction period of 1.1 seconds with an increase in the temperature to about 45° C.

The diazo solution is reacted in a circulation reactor with 5,500 parts per hour of a solution of 220 parts of crystallized sodium sulfite in 780 parts of water for the production of p-chlorophenylhydrazine.

The mixture overflowing from the circulation reactor, which contains a yellow suspension, is heated to 70° C., strongly acidified with hydrochloric acid and kept at 100° C. for five minutes. The p-chlorophenylhydrazine is obtained in an amount of 92% of the theory.

To prepare the azo dye of p-chloroaniline and β-naphthol, the diazo solution is united hourly with 4,260 parts of a solution of 74 parts of β-naphthol, 30 parts of sodium hydroxide and 106 parts of sodium carbonate in 790 parts of water in the circulation reactor. The effluent suspension contains the dye in a yield of 93% of the theory.

EXAMPLE 4

In the apparatus according to FIGURE 1, 4,100 parts of a solution of 45 parts of hydrogen chloride in 955 parts of water (reservoir 1), 64 parts of p-chloroaniline (reservoir 2) and 4,100 parts of a solution of 36 parts of sodium nitrite in 964 parts of water (reservoir 3) are mixed per hour in the flow tube. The temperature of the three reactants upon entry into the reactor is 89° C. After a reaction period of about 0.2 second, the boiling diazo solution leaves the reactor at about 100° C.

In the production of p-chlorophenylhydrazine by the process of Example 3, second paragraph, a yield of 92% of the theory is obtained.

In the production of the azo dye of p-chloroaniline and 1-phenyl-3-methylpyrazolone-(5) according to Example 2 or 3, a yield of dye of 94% of the theory is obtained.

EXAMPLE 5

In the apparatus according to FIGURE 1, 4,230 parts of a solution of 150 parts of aniline and 135 parts of hydrogen chloride in 715 parts of water (reservoir 1) and 3,200 parts of a solution of 153 parts of sodium nitrite in 847 parts of water (reservoir 2) are mixed per hour at the entrance to the flow tube at 25° C. The diazo solution formed has a temperature of 58° C. after a residence period of 1.2 seconds and is further reacted in a circulation reactor.

To prepare phenylhydrazine, the diazo solution is reacted hourly with 8,500 parts of a solution of 320 parts of sodium bisulfite in 680 parts of water in a cooled circulation reactor at a temperature of the circulating solution of 30° C. and a mean residence period of two minutes. The effluent reddish solution is heated during the course of fifteen minutes to 70° C., strongly acidified with hydrochloric acid, extracted with toluene to remove impurities and further heated to 100° C. The amount of phenylhydrazine present in the solution obtained is equivalent to 93% of the theory.

EXAMPLE 6

In the apparatus according to FIGURE 2, 4,230 parts of a solution of 150 parts of aniline and 135 parts of hydrogen chloride in 715 parts of water (reservoir 1) and 3,200 parts of a solution of 153 parts of sodium nitrite in 847 parts of water (reservoir 2) and united hourly by means of a nozzle. The reaction mixture flows within about one second down the inner wall of the container in a spiral path. The diazo solution formed collects in the lower part of the container at a temperature of about 55° C.

A yield of 92% of the theory of phenylhydrazine is obtained by reacting the diazo solution, in the manner described in Example 5, with 8,500 parts per hour of a solution of 320 parts of sodium bisulfite in 680 parts of water and processing as described in Example 5.

We claim:
1. In a process for the continuous diazotization of a primary amine wherein the diazotized amine is subsequently and rapidly converted to a stable compound, the improvement which comprises: continuously passing said primary amine and a diazotizing agent separately to a mixing and reacting zone, reacting said primary amine with said diazotizing agent within a period of 0.1 to 30 seconds while allowing at least 50% of the heat of reaction to be absorbed by the reaction mixture, the temperature of the reaction mixture thereby rising by from 20° to 50° C. to a temperature of from 40° to at least 100° C.

2. A process as in claim 1 wherein substantially all of the heat of reaction is absorbed by the reaction mixture.

3. A process as in claim 1 wherein the formed diazo compound is recovered before any substantial proportion thereof has decomposed.

References Cited

UNITED STATES PATENTS

| | | | |
|---|---|---|---|
| 2,013,180 | 9/1935 | Koch | 260—141 |
| 2,032,110 | 2/1936 | Bonkote | 260—141 |
| 2,447,867 | 8/1948 | Nies | 260—141 XR |
| 2,606,895 | 8/1952 | Lehmann et al. | 260—141 |
| 2,622,078 | 12/1952 | Klaasens et al. | 260—141 |
| 2,714,104 | 7/1955 | Chenicek et al. | 260—141 XR |
| 2,845,326 | 7/1958 | Streck | 260—141 |
| 3,148,179 | 9/1964 | Carboni | 260—141 XR |
| 3,203,989 | 8/1965 | Hupfu | 260—141 XR |

FOREIGN PATENTS

| | | |
|---|---|---|
| 626,965 | 9/1961 | Canada. |
| 812,368 | 4/1959 | Great Britain. |

OTHER REFERENCES

Fieser et al., "Organic Chemistry," 2nd ed., pp. 620–622 (1950).

FLOYD D. HIGEL, *Primary Examiner.*

U.S. Cl. X.R.

23—285, 284; 260—158, 206, 163, 196, 144, 569, 621, 205, 156, 152

UNITED STATES PATENT OFFICE
CERTIFICATE OF CORRECTION

Patent No. 3,423,391  January 21, 1969

Hubert Kindler et al.

It is certified that error appears in the above identified patent and that said Letters Patent are hereby corrected as shown below:

Column 7, line 10, "Bonkote" should read -- Bonhote --. Column 8, line 2, "Hupfu" should read -- Hupfer --. Columns 7 and 8, list of References Cited, add the following references:

667,935  2/1901  Ernst et al.
2,730,522  1/1956  Schetty

Signed and sealed this 21st day of April 1970.

(SEAL)
Attest:

Edward M. Fletcher, Jr.　　　　　　　　WILLIAM E. SCHUYLER, JR.
Attesting Officer　　　　　　　　　　　　Commissioner of Patents